Feb. 28, 1933.  F. MERTZ  1,899,470
MACHINE FOR DECORTICATING FIBER CONTAINING FOLIATE PLANTS
Filed May 9, 1931

Patented Feb. 28, 1933

1,899,470

UNITED STATES PATENT OFFICE

FRITZ MERTZ, OF MAGDEBURG, GERMANY, ASSIGNOR TO FIRM FRIED. KRUPP GRUSON-WERK AKTIENGESELLSCHAFT, OF MAGDEBURG-BUCKAU, GERMANY

MACHINE FOR DECORTICATING FIBER-CONTAINING FOLIATE PLANTS

Application filed May 9, 1931, Serial No. 536,265, and in Germany May 13, 1930.

This invention relates to machines for decorticating fiber-containing foliate plants of the kind having two sets of conveyors arranged in staggered relationship and consisting of endless ropes which carry the leaves or plants to be decorticated into and out of the zone of treatment. It is usual in this kind of machine to mount the rope sheaves of the two sets of conveyors upon the same shaft, with the result that when it is desired to place in position or to interchange the endless ropes, such operation is not only troublesome but also entails a considerable loss of time. The shaft carrying the two rope sheaves is usually separably coupled to a worm gear adapted to drive the shaft, which shaft must first be lifted from its bearings in order that the ends of the shaft may be exposed, to enable the endless ropes to be removed or to be placed in position. Consequently, both sheaves must be dismounted even when it is only a matter of replacing the rope of one sheave. The object of the present invention is to provide an improved machine in which the above mentioned disadvantages do not exist.

In accordance with the invention two adjacent driving sheaves are mounted upon the free projecting ends of separate shafts co-axially arranged, means being provided whereby the driving sheaves may be coupled to and uncoupled from each other. The coupling of the sheaves may, for example, be effected by means of one or more bolts or the like adapted to pass through each sheave.

Figure 1:
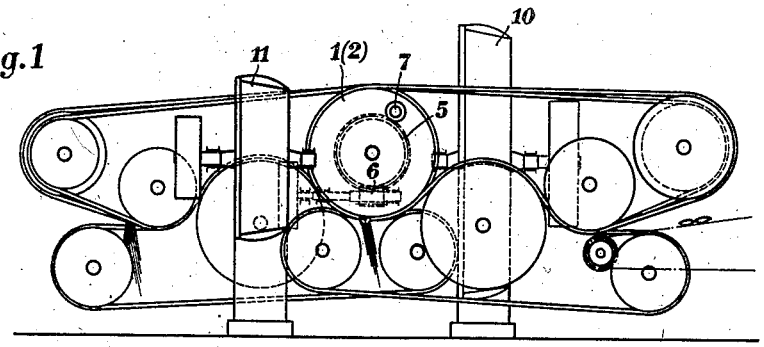
Figure 2:
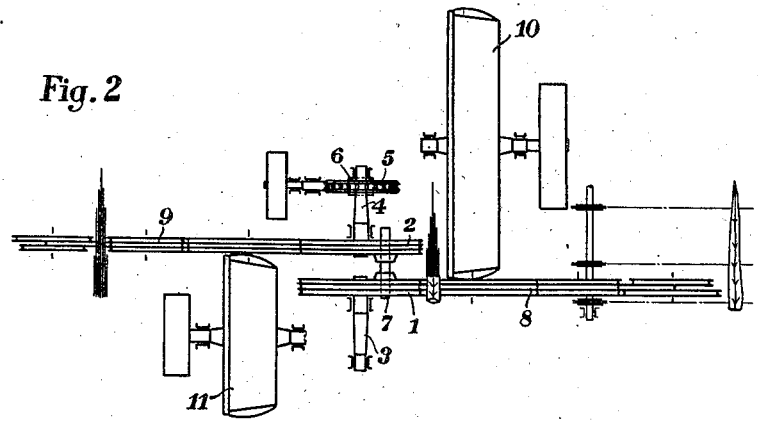
Figure 3:
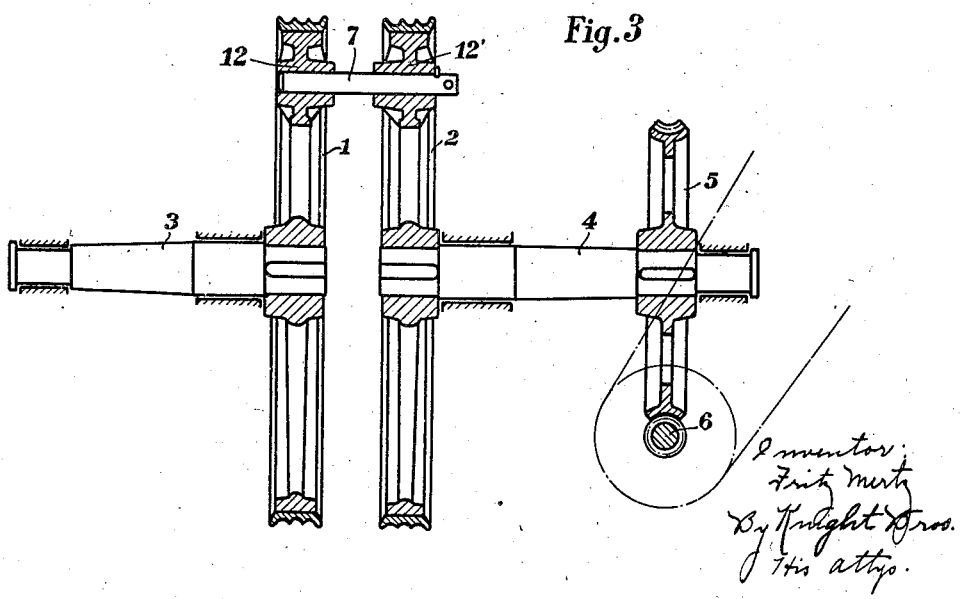

In order that the said invention may be clearly understood and readily carried into effect the same will now be more fully described with reference to the accompanying drawing wherein Fig. 1 shows a side elevation of a machine incorporating said invention, Fig. 2 is a plan view of the machine, and Fig. 3 is a detailed sectional view of one form of the invention.

Reference numerals 1 and 2 indicate the rope driving sheaves of two sets of staggered conveyors 8 and 9 of a decorticating machine of known type. Decorticating drums 10 and 11 cooperate with these conveyors. The sheave 1 is rigidly mounted upon the free projecting end of a shaft 3 while the sheave 2 is rigidly mounted upon the free projecting end of a shaft 4 which is arranged co-axially with the shaft 3. The shaft 4 carries a worm wheel 5 which is adapted to be rotated by a worm 6. The sheaves 1, 2 are in the embodiment shown connected together by means of one or more bolts 7 or the like engaging in boxes or sockets 12, 12'. Where more than one bolt is employed it is preferred to arrange the bolts in a circle near the periphery of the sheaves. When it is desired to exchange or place in position a rope in either set of the conveyors all that is necessary is to uncouple the two sheaves 1, 2 by withdrawing the bolt or bolts 7. Due to the journalling of the sheaves 1, 2, upon separate shafts 3 and 4 it is at once possible to effect this operation without the necessity of removing the shafts from their bearings.

What I claim is:—

1. In a decorticating machine, a plurality of sets of laterally displaced conveyors comprising a driving sheave for each conveyor, discrete shafts for said sheaves arranged co-axially with each other, driving means for one of said shafts, and detachable coupling means between said sheaves for transmitting the motion of said one shaft to the adjacent sheave.

2. In the combination claimed in claim 1 wherein said coupling means comprises one or more bolts engaging said sheaves.

The foregoing specification signed at Berlin, Germany this 28th day of April, 1931.

FRITZ MERTZ.